US008041709B2

(12) United States Patent
Permandla et al.

(10) Patent No.: US 8,041,709 B2
(45) Date of Patent: Oct. 18, 2011

(54) DOMAIN COLLAPSING OF SEARCH RESULTS

(75) Inventors: Pratibha Permandla, Bellevue, WA (US); Gaurav Sareen, Bellevue, WA (US); Girish Kumar, Redmond, WA (US); Junhua Wang, Sammamish, WA (US); Rohit V. Wad, Redmond, WA (US); William D. Ramsey, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 309 days.

(21) Appl. No.: 11/753,699

(22) Filed: May 25, 2007

(65) Prior Publication Data

US 2008/0294602 A1    Nov. 27, 2008

(51) Int. Cl.
*G06F 7/00* (2006.01)
*G06F 17/30* (2006.01)
(52) U.S. Cl. .................... 707/722; 707/737; 707/748
(58) Field of Classification Search .................. 707/3, 5, 707/2, 102, 4, 10, 7, 737, 752, 722, 723; 715/234
See application file for complete search history.

(56) References Cited

U.S. PATENT DOCUMENTS

| | | | | |
|---|---|---|---|---|
| 6,035,330 A * | 3/2000 | Astiz et al. | ..................... | 709/218 |
| 6,138,113 A | 10/2000 | Dean et al. | | |
| 6,211,877 B1 * | 4/2001 | Steele et al. | .................. | 715/804 |
| 6,314,424 B1 * | 11/2001 | Kaczmarski et al. | ........... | 707/10 |
| 6,484,166 B1 | 11/2002 | Maynard | | |
| 6,847,977 B2 * | 1/2005 | Abajian | ........................ | 707/102 |
| 6,920,448 B2 | 7/2005 | Kincaid et al. | | |
| 6,996,569 B1 * | 2/2006 | Bedell et al. | .................. | 707/100 |
| 2003/0214538 A1 * | 11/2003 | Farrington et al. | ........... | 345/854 |
| 2003/0220853 A1 * | 11/2003 | Back et al. | ....................... | 705/29 |
| 2005/0004889 A1 * | 1/2005 | Bailey et al. | ...................... | 707/1 |
| 2005/0080770 A1 * | 4/2005 | Lueder et al. | ...................... | 707/3 |
| 2005/0144157 A1 * | 6/2005 | Moody et al. | ..................... | 707/3 |
| 2005/0246332 A1 | 11/2005 | Wang et al. | | |
| 2005/0289109 A1 * | 12/2005 | Arrouye et al. | ................... | 707/1 |
| 2006/0143159 A1 | 6/2006 | Chowdhury et al. | | |
| 2006/0248066 A1 | 11/2006 | Brewer | | |
| 2006/0265417 A1 | 11/2006 | Amato et al. | | |
| 2006/0282416 A1 | 12/2006 | Gross et al. | | |
| 2007/0011146 A1 * | 1/2007 | Holbrook | .......................... | 707/3 |
| 2007/0112606 A1 * | 5/2007 | Deljo et al. | ....................... | 705/5 |
| 2007/0136256 A1 * | 6/2007 | Kapur et al. | ...................... | 707/3 |
| 2007/0192293 A1 * | 8/2007 | Swen | ................................ | 707/3 |
| 2007/0276811 A1 * | 11/2007 | Rosen | ............................... | 707/3 |

(Continued)

OTHER PUBLICATIONS

Google, Google Search, Aug. 24, 2007,IDS, http://google.com/search?hl=en&q=Microsoft, 1 Page.*

(Continued)

*Primary Examiner* — James Trujillo
*Assistant Examiner* — Pavan Mamillapalli
(74) *Attorney, Agent, or Firm* — Shook, Hardy & Bacon L.L.P.

(57) ABSTRACT

Systems, methods, computer-readable media, and graphical user interfaces for presenting search results having collapsed domains are provided. A search result obtaining module obtains search results based upon a received query. Upon obtaining the search results, search results having the same domain are associated with one another. Thereafter, search result clusters of associated search results are formed. In some embodiments, the search result clusters may be formatted to include desired search result cluster attributes. The search result clusters are presented such that two or more associated search results form a single cluster of search results rather than being presented individually. In some embodiments, an option to view more search results with the same domain may be provided.

20 Claims, 7 Drawing Sheets

U.S. PATENT DOCUMENTS

| | | | |
|---|---|---|---|
| 2008/0005668 A1* | 1/2008 | Mavinkurve et al. | 715/526 |
| 2008/0010291 A1* | 1/2008 | Poola et al. | 707/10 |
| 2008/0010292 A1* | 1/2008 | Poola | 707/10 |
| 2008/0183668 A1* | 7/2008 | Bhamidipaty et al. | 707/2 |

OTHER PUBLICATIONS

Greg Notess, Google Search ScreenShot, Dec. 28, 2006, Flickr, http://www.flickr.com/photos/46102639@N00/337044803/sizes/o, 1 Page.*

Hao Chen and Susan Dumais "Bringing Order to the Web: Automatically Categorizing Search Results" Apr. 2000, pp. 145-152, CHI Letters vol. 2, Issue 1, CHI '2000 The Hague, Amsterdam, scils.rutgers.edu/muresan/Courses/Spring2004/551_IR/Resources/Docs/sigchiChen2000.pdf.

Christoph Kunz, Veit Botsch "Visual Representation and Contextualization of Search Results—List and Matrix Browser" Proc. Int. Conf. on Dublin Core and Metadata for e-Communities 2002, pp. 229-234, Firenze University Press, DC-2002, Oct. 13-17—Florence, Italy, bncf.net/dc2002/program/ft/poster10.pdf.

Paula J. Hane, "FAST Launches Enhanced ALLTheWeb.com Search Engine" Information Today, Inc., posted on Jul. 16, 2001, 2 pages, newsbreaks.infotoday.com/nbreader.asp?ArticleID=17549.

Joao Ferreira, Alberto Rodrigues Da Silva, and Jose Delgado "How to Improve Retrieval Effectiveness on the Web?" in Proceedings of the E-Society 2004 Conference (E-Society2004) IADIS 2004, 9 pages, berlin.inesc-id.pt/slb/static/papers/2004/jf-esociety2004.pdf.

Google Search, Aug. 24, 2007, 2 pages, google.com/search?hl=en&q=Microsoft.

* cited by examiner

DOMAIN COLLAPSING OF SEARCH RESULTS

BACKGROUND

Search engines have become an efficient and effective tool for finding and retrieving information, i.e., search results, relevant to a user's query. The relative placement of search results greatly affects the probability that a user will find desired information. Today, to determine the relative placement of search results, many search engines organize search results based on a document ranking. The method employed to rank documents varies widely among search engines. Most search engines, however, determine a document ranking based on, at least in part, one or more query terms, e.g., a word or phrase entered by a user. For instance, in a vertically displayed listing of search results, the result(s) most relevant to the user's query terms are generally positioned at or near the top of the listing.

As a result of listing documents based, at least in part, on document ratings, documents having the same domain may be dispersed throughout the displayed search results. For example, the search results of a specific query may list a document on the first search result page and another document having the same domain on the fifth search result page. Accordingly, the dispersed listing of documents having the same domain may require a significant amount of time to view each search result page to locate the desired information. As such, user satisfaction may decline. Moreover, a user with a limited amount of search time may be unsuccessful in locating the desired information.

In addition, a dispersed listing of documents having the same domain may utilize a significant amount of search result space. For example, the search results of a specific query may list ten documents on the first search result page having the same domain and another ten documents on the second search result page having the same domain. Each such search result listing may include, for example, a snippet, the URL, the title, and the like. As such, multiple search results pertaining to documents having the same domain may utilize and clutter a majority of both the first and second search result pages. In addition to the amount of search result space utilized by multiple search results related to documents having the same domain, the clutter may result in a tedious and time consuming user query experience.

BRIEF SUMMARY

Embodiments of the present invention relate to systems, graphical user interfaces, and computer-readable media for presenting search results having collapsed domains. A search result obtaining module obtains search results based on a user's query. Upon obtaining the search results, search results having the same domain are associated and search result clusters of associated search results are formed such that two or more associated search results are presented as a single cluster of search results rather than presented individually.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, methods, computer-readable media, and graphical displays for presenting search results having collapsed domains. A search result obtaining module obtains search results based on a user's query. Upon obtaining the search results, search results having the same domain are associated. "Domain," as used herein, refers to at least a portion of a Uniform Resource Locator (hereinafter "URL"). Thereafter, search result clusters of associated search results are formed. In some embodiments, the search result clusters may be formatted to include desired search result cluster attributes. The search result clusters are presented such that two or more associated search results are presented as a single cluster of search results rather than presented individually. In some embodiments, an option to view more search results having the same domain may be provided.

Accordingly, in one aspect, the present invention provides a computerized system for collapsing search results having the same domain. The system includes a search result obtaining module, a collapsing module, and a presenting module. The search result obtaining module is configured to obtain one or more search results relevant to a user query. The collapsing module is configured to form one or more search result clusters, wherein each of the search result clusters includes two or more obtained search results that have the same domain. The presenting module is configured to present one or more search results obtained by the search result obtaining module and one or more search result clusters formed by the collapsing module.

In another aspect, the present invention provides one or more computer-readable media having computer-executable instructions embodied thereon that, when executed, perform a method for estimating expected performance of advertisements. The method includes obtaining one or more search results relevant to one or more query terms; associating one or more of the one or more search results having the same domain; forming one or more search result clusters, wherein each of the search result clusters includes two or more associated search results; and presenting one or more search result clusters.

In a further aspect, the present invention provides a graphical user interface embodied on one or more computer-readable media and executable on a computing device. The graphical user interface includes a first display area configured for displaying one or more search result clusters, wherein each of the search result clusters includes two or more search results having the same domain.

Having briefly described an overview of embodiments of the present invention, an exemplary operating environment suitable for implementing embodiments hereof is described below.

Figure 1:
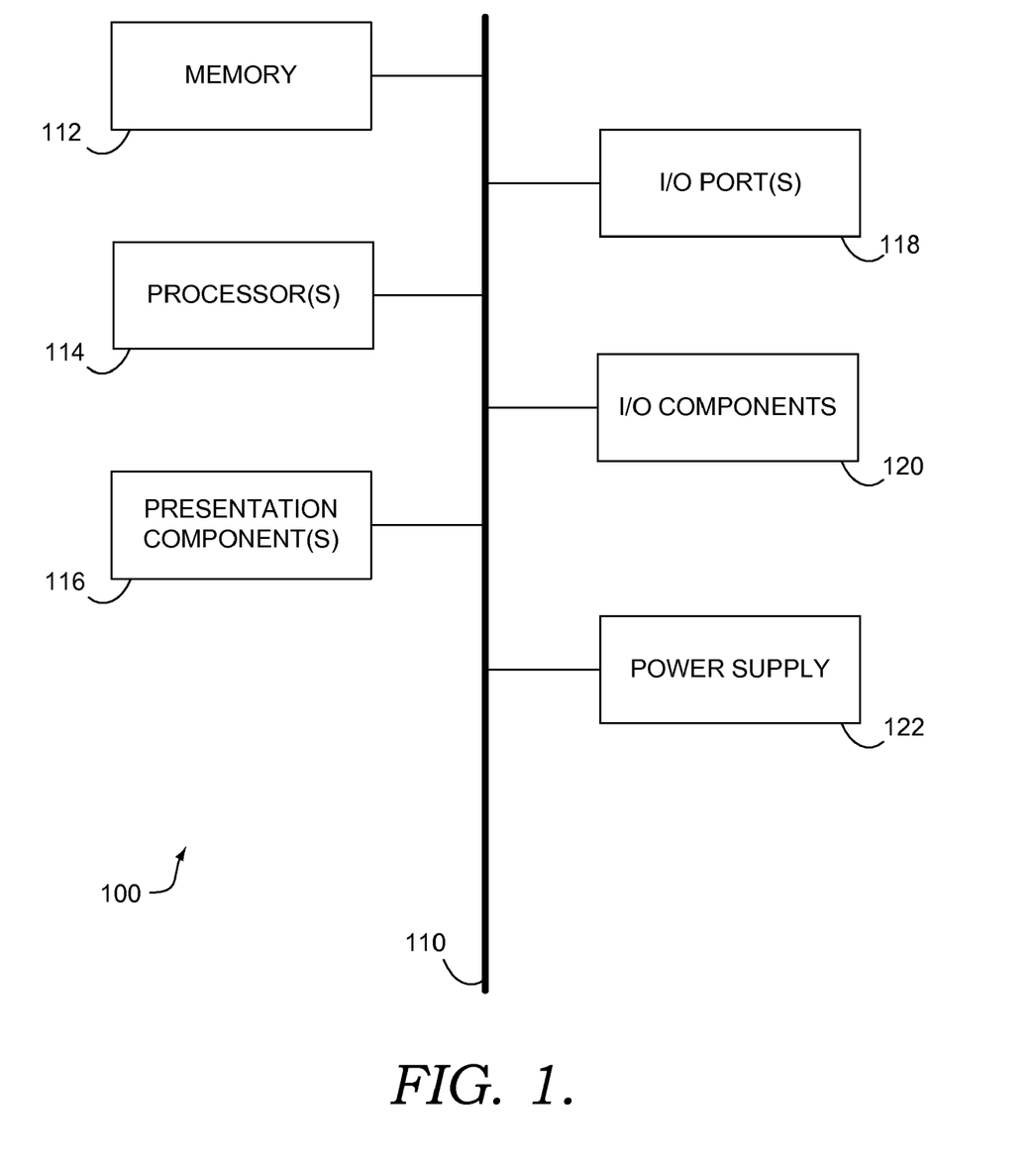
FIG. 1 is a block diagram of an exemplary computing environment suitable for use in implementing embodiments of the present invention.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

As previously set forth, embodiments of the present invention relate to computing systems for the domain collapsing of search results. As used herein, the phrase "domain collapsing of search results" refers to associating search results having the same domain and forming search result clusters of associated search results such that associated search results are presented as a single cluster of search results rather than presented individually. As previously mentioned, "domain," as used herein, refers to at least a portion of a Uniform Resource Locator (hereinafter "URL"). The domain of a specific URL may depend on the URL type. For example, in cases where the URL ends with a country specific tag, the domain includes the last three words of the URL before the first forward slash, i.e. /. Accordingly, the domain of the URL www.msn.co.in/ is "msn.co.in". In cases where the URL does not end with a country specific tag, the domain is the last two words of the URL before the first forward slash, i.e. /. As such, the domain of the URL www.msn.com is "msn.com". A "search result cluster," as used herein, refers to two or more search results having the same domain that are grouped together. Search results may correspond to a search for information on the public Web, intranets, personal search engines, mobile search engines, and the like.

Figure 2:
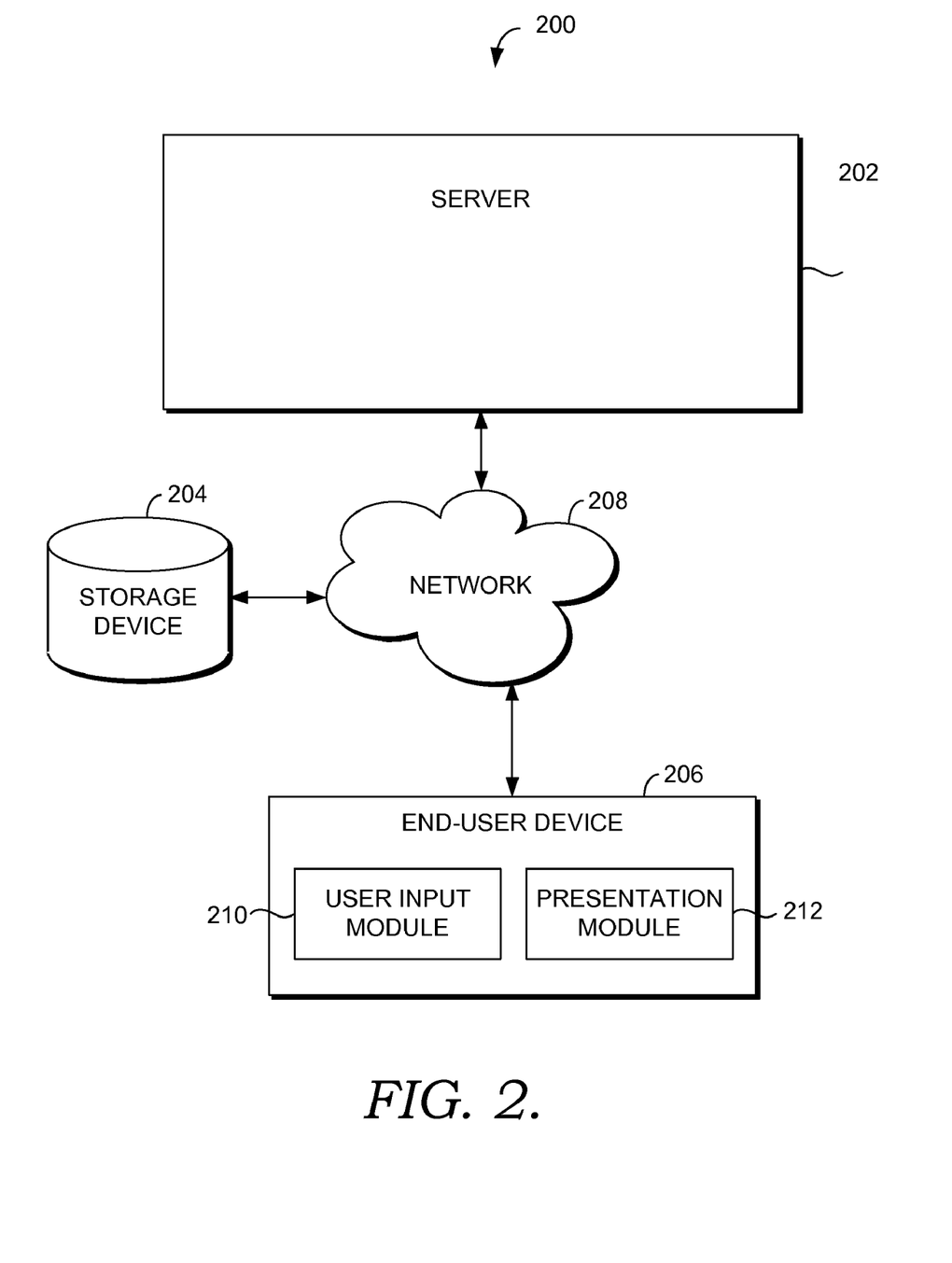
FIG. 2 is a block diagram of an exemplary computing system architecture suitable for use in implementing embodiments of the present invention.

With reference to FIG. 2, a block diagram is illustrated that shows an exemplary computing system architecture 200 configured for use in implementing embodiments of the present invention. It will be understood and appreciated by those of ordinary skill in the art that the computing system architecture 200 shown in FIG. 2 is merely an example of one suitable computing system and is not intended to suggest any limitation as to the scope of use or functionality of the present invention. Neither should the computing system architecture 200 be interpreted as having any dependency or requirement related to any single module/component or combination of modules/components illustrated therein.

Computing system architecture 200 includes a server 202, a storage device 204, and an end-user device 206, all in communication with one another via a network 208. The network 208 may include, without limitation, one or more local area networks (LANs) and/or wide area networks (WANs). Such networking environments are commonplace in offices, enterprise-wide computer networks, intranets and the Internet. Accordingly, the network 208 is not further described herein.

The storage device 204 is configured to store information associated with a domain collapsing feature, i.e., a feature that performs the domain collapsing of search results. In various embodiments, such information may include, without limitation, domains, domain IDs, documents, and the like. As used herein, the term "document" refers to any document having a domain, for example, a webpage or a website. In embodiments, the storage device 204 is configured to be searchable for one or more of the items stored in association therewith. It will be understood and appreciated by those of ordinary skill in the art that the information stored in association with the storage device 204 may be configurable and may include any information relevant to the domain collapsing feature. The content and volume of such information are not intended to limit the scope of embodiments of the present invention in any way. Further, though illustrated as a single, independent component, the storage device 204 may, in fact, be a plurality of storage devices, for instance a database cluster, portions of which may reside on the server 202, the end-user device 206, another external computing device (not shown), and/or any combination thereof.

Each of the server 202 and the end-user device 206 shown in FIG. 2 may be any type of computing device, such as, for example, computing device 100 described above with reference to FIG. 1. By way of example only and not limitation, each of the server 202 and the end-user device 206 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

The server 202 may include any type of application server, database server, or file server configurable to perform the methods described herein. In addition, the server 202 may be a dedicated or shared server. One example, without limitation, of a server that is configurable to operate as the server 202 is a structured query language ("SQL") server executing server software such as SQL Server 2005, which was developed by the Microsoft® Corporation headquartered in Redmond, Wash.

Components of server 202 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via a network, e.g., network 208. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system architecture 200 is merely exemplary. While the server 202 is illustrated as a single unit, one skilled in the art will appreciate that the server 202 is scalable. For example, the server 202 may in actuality include a plurality of servers in communication with one another. Moreover, the storage device 204 may be included within the server 202 or end-user device 206 as a computer-storage medium. The single unit depictions are meant for clarity, not to limit the scope of embodiments in any form.

As shown in FIG. 2, the end-user device 206 includes a user input module 210 and a presentation module 212. In some embodiments, one or both of the modules 210 and 212 may be implemented as stand-alone applications. In other embodiments, one or both of the modules 210 and 212 may be integrated directly into the operating system of the end-user device 206. It will be understood by those of ordinary skill in the art that the modules 210 and 212 illustrated in FIG. 2 are exemplary in nature and in number and should not be construed as limiting. Any number of modules may be employed to achieve the desired functionality within the scope of embodiments hereof.

The user input module 210 is configured for receiving input of one or more query terms. Typically, query terms are input via a user interface (not shown) associated with the end-user device 206, or the like. Upon receiving input of query terms, the presentation module 212 of the end-user device 206 is configured for presenting search results. In one embodiment, the presentation module 212 presents a plurality of search results utilizing a display device associated with the end-user device 206. Embodiments, however, are not intended to be limited to visual display but rather may also include audio presentation, combined audio/video presentation, and the like.

Figure 3:
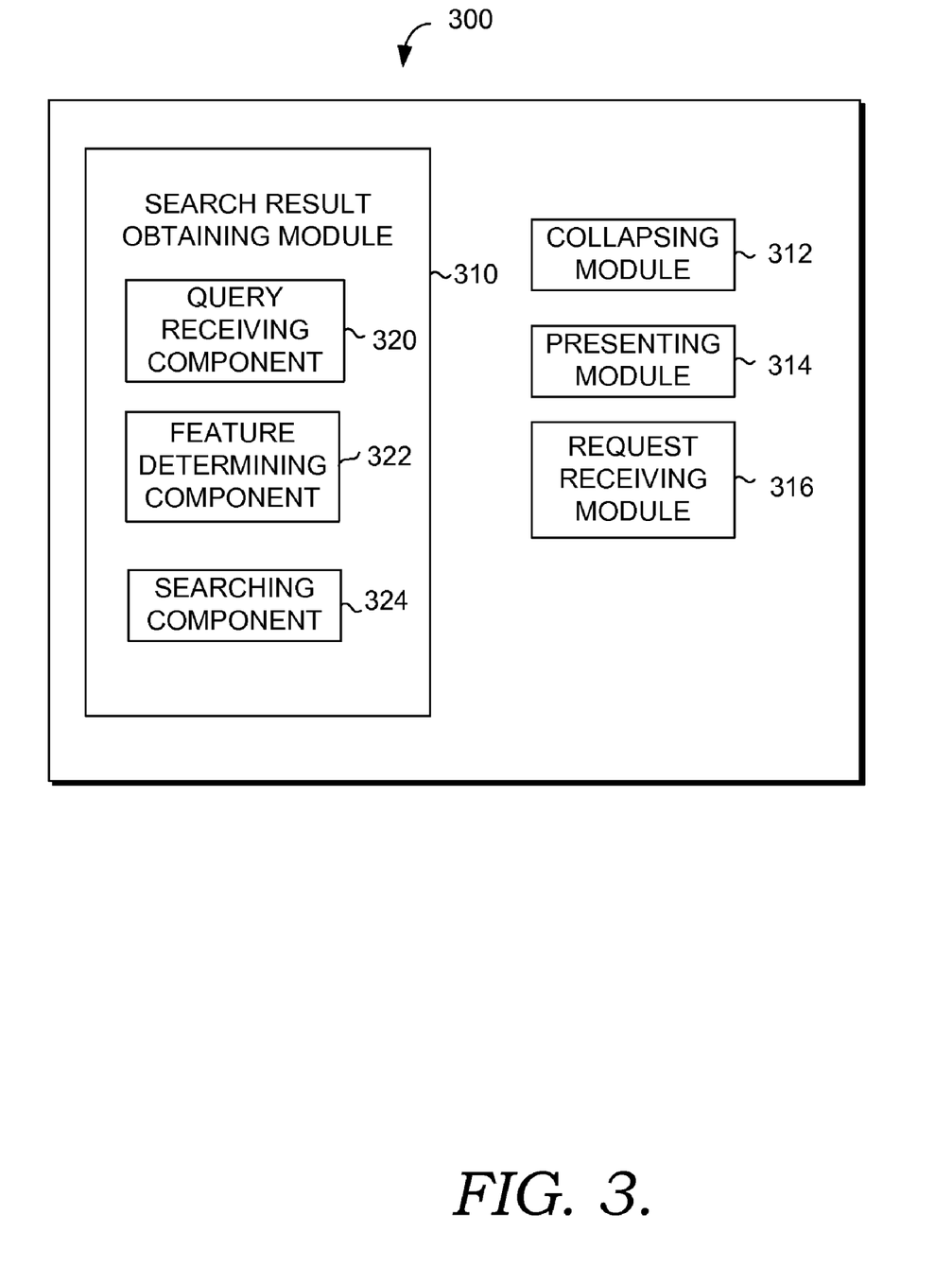
FIG. 3 is a block diagram of an exemplary computer system for use in implementing embodiments of the present invention

FIG. 3 illustrates an exemplary computing system 300 for providing a domain collapsing feature that performs domain collapsing of search results. As shown in FIG. 3, an exemplary computing system 300 includes a search result obtaining module 310, a collapsing module 312, a presenting module 314, and a request receiving module 316. In some embodiments, one or more of the illustrated modules may be implemented as stand-alone applications. In other embodiments, one or more of the illustrated modules may be integrated directly into the operating system of the server 202, a cluster of servers (not shown) and/or the end-user device 206. It will be understood by those of ordinary skill in the art that the modules illustrated in FIG. 3 are exemplary in nature and in number and should not be construed as limiting. Any number of modules may be employed to achieve the desired functionality within the scope of embodiments hereof. Further, modules may be located on any number of servers or computing devices. By way of example only, search result obtaining module 310 may reside on a cluster of servers. In such a case, the search results may be sent to yet another server networked to an end user.

The search result obtaining module 310 is configured for obtaining search results. The search results obtained may include all relevant search results or a specific portion, e.g., number or percent, of relevant search results. For example, in an embodiment where a specific portion of relevant search results are obtained, upon receiving a user query, five million documents may be searched and 15,000 documents may be relevant to the user query. In such a case, although 15,000 relevant search results exist, only the 10,000 most relevant search results may be obtained to be presented upon the user's query.

In one embodiment, the search result obtaining module 310 obtains search results by either receiving or retrieving search results provided by another server, cluster of servers, user device, or any combination thereof. In such an embodiment, search result obtaining module 310 may include a receiving/retrieving component (not shown) and a modifying component (not shown). The receiving/retrieving component is configured to obtain at least a portion of relevant search results by receiving or retrieving the search results from one or more computing devices. The modifying component may be configured to perform search result modifications upon receiving or retrieving relevant search results. For example, the modifying component may restrict the total number of search results obtained, restrict the number of search results obtained that have the same domain, rank the search results, and the like.

Alternatively, as illustrated in FIG. 3, search result obtaining module 310 obtains desired search results by determining the search results. In such an embodiment, search result obtaining module 310 may include a query receiving component 320, a feature determining component 322, and a searching component 324. One or more of the illustrated components may be implemented as stand-alone applications or integrated directly into the operating system of the server 202, a cluster of servers (not shown), or the end-user device 206. It will be understood by those of ordinary skill in the art that the components illustrated in FIG. 3 are exemplary in nature and in number and should not be construed as limiting. Any number of components may be employed to achieve the desired functionality within the scope of embodiments hereof.

The query receiving component 320 is configured for receiving a query, i.e., a request for information that may pertain to one or more search terms. A query may be received upon a user inputting one or more terms and, thereafter, selecting a search tool to submit the query, such as an icon, "search" button, or the like. Alternatively, a query may be received upon a user selecting text presented on a display associated with the end-user device 206. For example, selectable text may be displayed within a menu, drop-down box, table of contents, list, or index on a website.

The feature determining component 222 is configured to determine if the domain collapsing feature is activated. In some embodiments, the domain collapsing feature may be activated and inactivated by a system developer or administrator. In such an embodiment, a system developer or administrator may activate the domain collapsing feature, for example, by setting program code pertaining to domain collapsing, e.g., IsDomainCollapsing flag, to one. In some cases, where the domain collapsing feature is activated, the system may not utilize a host collapsing function because domain collapsing may be a superset of host collapsing. A host collapsing function collapses search results having the same host. As used herein, the term "host" refers to the entire portion of a URL before the first forward slash, i.e. /. For example, where a first search result is search.msn.com/x.html and a second search result is search.msn.com/y.html, both the first and second search results have the same host and, therefore, the two search results are collapsed into one result. On the other hand, a system developer or administrator may inactivate the domain collapsing feature, for example, by setting program code pertaining to domain collapsing, e.g.,
IsDomainCollapsing flag, to zero. In some cases, where the domain collapsing feature is inactivated, the system may default to the host collapsing function.

In other embodiments, the domain collapsing feature may be activated and inactivated by a user. For example, a user may select a selectable button or text that activates the domain collapsing feature. In such a case, the domain collapsing feature may remain activated until selected again by a user at a later instance.

It will be understood by those of ordinary skill in the art that computing system 300 is merely exemplary. While the feature determining component 322 is illustrated as a component of the search result obtaining module 310, one skilled in the art will appreciate that the feature determining component 322 may comprise a module/component distinct from the search result obtaining module 310. For example, where the search result obtaining module 310 obtains search results by receiving or retrieving search results provided by another server, end-user device, or a combination thereof, the feature determining component 322 may be a separate module/component that determines whether the domain collapsing feature is activated or inactivated. The illustrated modules and components are shown herein for clarity of description and are not intended to limit the scope of embodiments of the present invention.

The searching component 324 is configured to search for and obtain search results. In one embodiment, searching component 324 may search for relevant information by searching documents, indices, or a combination thereof. The search results obtained by searching component 324 may include all relevant search results or a specific number or percentage of relevant search results. Searching component 324 may further be configured to organize or restrict obtained search results. For example, searching component 324 may organize the search results by a document ranking based, in part, on the relevance of the document to the query. In addition, the searching component 324 may restrict the total number of search results obtained or the number of search results having the same domain.

In one embodiment, searching component 324 may include multiple computing devices, such as computing device 100 of FIG. 1, that are used to search for and obtain search results. In such an embodiment, searching component 324 may include one or more bottom level aggregators (i.e., index file managers), middle level aggregators, top level aggregators, or a combination thereof. Such a hierarchy of aggregators, if utilized, may allow for searching an immense number of documents and efficiently obtaining the most relevant search results. An index file manager is a computing device, such as computing device 100 of FIG. 1, which may store documents in the form of an index so that the index file manager may search documents more efficiently. The documents or indices may be stored, for example, in storage device 204 of FIG. 2. One skilled in the art will recognize that any number of index file managers may be utilized to more efficiently search for and obtain search results. For example, searching component 324 may have five hundred index file managers with each index file manager searching a vast amount of documents, e.g., ten million documents.

Index file managers may search for and obtain search results for all relevant documents. For example, an index file manager may locate twenty documents relevant to a user's query terms and, thereafter, include the twenty documents as search results. In addition to searching for and obtaining search results for all relevant documents, index file managers may perform a number of other functions, such as limiting the total number of search results obtained, ranking documents, limiting the number of search results obtained that have the same domain, aggregating search results, and the like.

In some embodiments, limiting the total number of search results obtained may be desired, for example, to efficiently present search results to a user. To limit the total number of search results obtained, index file managers may search for all relevant information and obtain only a limited number of relevant search results. For example, although an index file manager may locate twenty documents relevant to a user's query terms, the index file manager may only obtain search results for five documents.

A dynamic document ranker within an index file manager may rank the documents based on query relevancy. Ranking documents enhances user satisfaction. For example, in embodiments where the total number of search results is limited or the number of search results having the same domain is limited, document rankings provide a method for determining the search results to obtain and, thereafter, present to a user. In addition, document rankings provide a method for organizing search results such that a user may view the most relevant documents first. As such, where the index file manager obtains search results for only five of the twenty relevant documents, all twenty relevant documents may be ranked by the dynamic document ranker, and the index file manager may obtain search results for the five highest ranked documents.

To prevent an index file manager from obtaining all search results that have the same domain, an index file manager may include a limit to the number of search results obtained that have the same domain. For example, assume the index file manager restricts the total number of relevant search results obtained to five search results. In this case, the index file manager may further limit the search results such that only two of the five search results have the same domain. In such a case, a document ranking may be utilized to determine the most relevant search results. To determine whether documents or search results include the same domain, in one embodiment, the domains may be compared with one another. Alternatively, each domain may be associated with a unique identifier, e.g., a domain ID, and the unique identifiers may be compared with one another to determine whether search results or documents have the same domain. For example, a domain hash may receive a URL and output a unique identifier associated to a domain. In such a case, where the domain hash outputs the same identifier value for two URLs, the two URLs have the same domain.

Another function an index file manager may perform includes aggregating search results. Each index file manager may aggregate search results. In one embodiment, search results may be aggregated based on an identifier, such as a domain or domain ID.

Upon one or more index file managers searching for and obtaining search results, the search results may be presented to one or more middle level aggregators, for example, via a document bag. A document bag is a structure used to pass search results from one computing device to another computing device. A document bag may receive a domain, domain ID, URL, and/or other search result information associated with one or more domains. In one embodiment, each index file manager may write the domain IDs, and other associated information, if desired, of the search results into a single document bag. Alternatively, multiple document bags may be utilized to transfer search results, e.g., a document bag corresponding to each index file manager or a document bag corresponding to each middle level aggregator such that all index file managers that provide search results to a middle level aggregator use the same document bag.

In an embodiment where searching component 324 includes one or more middle level aggregators, the one or more middle level aggregators may receive the search results, for example, via one or more document bags. One or more middle level aggregators may be utilized by searching component 324 to restrict the number of index file managers that communicate with a computing device, such as a top level aggregator. In one embodiment, the middle level aggregators aggregate the search results received from a plurality of index file managers. Each middle level aggregator may correspond to a specific number of index file managers. For example, one middle level aggregator may receive search results from twenty index file managers. As such, where five hundred index file managers search for and obtain search results, twenty five middle level aggregators may receive search results such that each of the twenty five middle level aggregators receive search results from twenty index file managers. It will be understood by those of ordinary skill in the art any number of levels of middle level aggregators may be employed to achieve the desired functionality within the scope of embodiments hereof. For example, in such an embodiment, a first level of middle level aggregators may include twenty five computing devices and a second level of middle level aggregators may include five computing devices to further narrow the number of computing devices that communicate with a computing device, such as a top level aggregator, and to provide efficient search results.

In some embodiments, a middle level aggregator may perform functions similar to the index file manager, e.g., limiting the total number of search results obtained, ranking documents, limiting the number of search results obtained that have the same domain, aggregating search results, and the like. For example, each middle level aggregator may include a dynamic ranker to rank the aggregated search results based on relevancy to the query terms. In addition, each middle level aggregator may limit the total number of search results obtained, limit the number of search results obtained having the same domain, or a combination thereof. Further, each middle level aggregator may aggregate the search results received from the multiple index file managers based on, for example, domain, domain ID, or the like.

Upon aggregating search results and performing other desired functions, the search results may be presented to one or more computing devices, such as a top level aggregator, for example, via a document bag. A document bag may receive a domain, domain ID, URL, and/or other search result information associated with one or more domains. In one embodiment, each middle level aggregator may write the domain IDs, and other associated information if desired, of the search results into a single document bag. In other embodiments, multiple document bags may be utilized to transfer search results, e.g., a document bag for each middle level aggregator or a document bag for each top level aggregator such that all middle level aggregators that provide search results to a top level aggregator use the same document bag.

In an embodiment where searching component 324 includes one or more top level aggregators, the one or more top level aggregators may receive the one or more document bags. One skilled in the art will recognize that a top level aggregator may receive a document bag from a middle level aggregator, an index file manager, or any combination thereof. Top level aggregators aggregate the search results received from a plurality of middle level aggregators. Each top level aggregator may correspond to a specific number of middle level aggregators. In one embodiment, searching component 324 may include only one top level aggregator.

For example, one top level aggregator may receive search results from twenty five middle level aggregators.

In some embodiments, a top level aggregator may perform functions similar to index file managers and/or middle level aggregators, e.g., limiting the total number of search results obtained, ranking documents, limiting the number of search results obtained that have the same domain, and aggregating search results. For example, each top level aggregator may include a dynamic ranker to rank the aggregated search results based on relevance to the query terms. In addition, each top level aggregator may limit the total number of search results obtained, limit the number of search results obtained having the same domain, or a combination thereof. Further, each top level aggregator may aggregate the search results received from the multiple index file managers based on, for example, domain, domain ID, or the like.

Collapsing module 312 is configured to collapse search results having the same domains. As such, collapsing module 312 associates search results having the same domain and forms search result clusters of associated search results such that associated search results are presented as a single cluster of search results rather than presented individually. As previously mentioned, a search result cluster includes two or more search results having the same domain that are grouped together. Search results may be associated based on the document domain or domain ID. In an embodiment where search results are associated by domain ID, collapsing module 312 may be further configured to provide a domain ID, i.e., a unique identifier, to each document, for example, via a domain hash. In such a case, the same domain ID is provided for documents having the same domain.

Collapsing component 312 may further be configured to provide search result cluster attributes. Search result cluster attributes may be set forth by a system administrator or developer preference or a user preference, e.g., a user's selection on the end-user device 206. Search result cluster attributes may include, for example, search result rankings, relationship structures, search result limitations, structure components, title collapsing, URL collapsing, or a combination thereof. The search result rankings attribute provides document rankings so that the search results listed within a search result cluster may be positioned according to document ranking. For example, the search result with the highest document ranking may be positioned at or near the top of the search result cluster.

The relationship structures attribute allows the search result within a search result cluster to be presented in a relationship structure, e.g., parent/child relationship. For example, each search result cluster may have one parent search result with the remaining search results comprising children search results. In such a case, the parent search result may be the search result associated with the highest ranked document.

The search result limitations attribute limits the number of search results presented within a search result cluster. Where a limited number of search results are presented within a search result cluster, document rankings may be utilized to determine the search results to present. As such, the documents with higher rankings may be included in the search result cluster. In an embodiment having one or more parent search results and child search results, the search result limitation attribute may limit both the number of parent and child search results presented within a search result cluster. In such an embodiment, for example, one search result cluster may include only one parent search result and five children search results. Because the search result limitations attribute limits the number of search results presented in a search result cluster, the search result limitations attribute may provide an option to view the search results not presented within the search result cluster. In such a case, a user may select a selectable icon, button, or text, e.g., "Show more results from this domain," to view the search results.

The structure component attribute allows a user, a system administrator or developer, or the like, to specify the search result structure components to present. Structure components may include, for example, a document URL, a document caption URL, a document title, a document snippet, a document domain, a cached page feature, and the like. A structure component set, as used herein, includes two or more structure components presented for a particular search result. A document URL is the actual URL of the document, e.g., actual URL of a webpage. A document caption URL is the URL in a form that is displayed to a user. A document title is the title of the document. A document snippet includes language that describes the specific document. A document domain is the domain of the document. A cached page feature is a selectable feature that, once selected, presents a cached page. In one embodiment, one or more of the structure components may be selectable such that a user may select the structure component to view the document associated with the search result. In an embodiment where a parent/child relationship is presented, a first structure component or first structure component set may be presented for the one or more parent search results, and a second structure component or second structure component set may be presented for the one or more child search results. For example, a parent search result may include a structure component set comprising a document title, a document snippet, a document caption URL, and a cached page feature while the child search results may include a structure component set comprising merely a document title and a snippet. Such a variance in structure component sets may be utilized to restrict clutter presented on a search result page.

The title collapsing attribute collapses search results having the same title. In one embodiment, collapsing search results having the same title results in the presentation of only one such search result. In such an embodiment, the search result associated with the highest document ranking may be presented.

The URL collapsing attribute collapses search results having the same URL. In one embodiment, collapsing search results having the same URL results in the presentation of only one search result. In such an embodiment, the search result associated with the highest document ranking may be presented.

One skilled in the art will appreciate that, in one embodiment, one or more of the functions of the collapsing module 312, e.g., associating search results having the same domain, forming search result clusters of associated search results, and/or providing search result cluster attributes, may be performed by the searching component 324, for example, via one or more index file managers, middle level aggregators, top level aggregators, or a combination thereof. The depictions set forth in FIG. 3 are meant for clarity and not to limit the scope of embodiments in any form.

The presenting module 314 is configured to present the search results, including search result clusters, where appropriate. In one embodiment, one or more document bags may be utilized to present the search results. Search results may be presented in a variety of forms, e.g., document ranking order, first-in-first-out order, last-in-first-out order, and the like. In an embodiment where search results presented within a search result cluster are limited to a specific number, the presenting component 314 may be further configured to present an option to view the search results not presented within the search result cluster. In such a case, a user may select a selectable icon, button, or text, e.g., "Show more results from this domain," to view the search results.

The request receiving component 316 is configured to receive a request to view more search results having the same domain. The request receiving component 316 may be utilized where all search results having the same domain are not presented within a search result cluster. A request to view more search results having the same domain may be received upon a user selecting a selectable icon, button, or text. In one embodiment, upon the request receiving component 316 receiving a request to view more search results having the same domain, the search result obtaining module 310, the collapsing module 312, and/or the presenting module 314 may be utilized to present relevant search results having the same domain that were not presented within the search result cluster, i.e., desired search results. In such an embodiment, the search result obtaining module 310 may filter desired search results from all other relevant search results. For example, the original search query may be initiated, and the index file managers may only obtain desired search results. In an alternative embodiment, the desired search results may be stored in a storage device, such as storage device 204 of FIG. 2, such that, upon selection to view the more search results having the same domain, the desired search results only need to be retrieved from the storage device and presented. In one embodiment, the request receiving component 316 may be incorporated into the query receiving component 320 of the search result obtaining module 310. In such an embodiment, the query receiving component 320 is further configured to receive a request to view more search results having the same domain.

Figure 4:
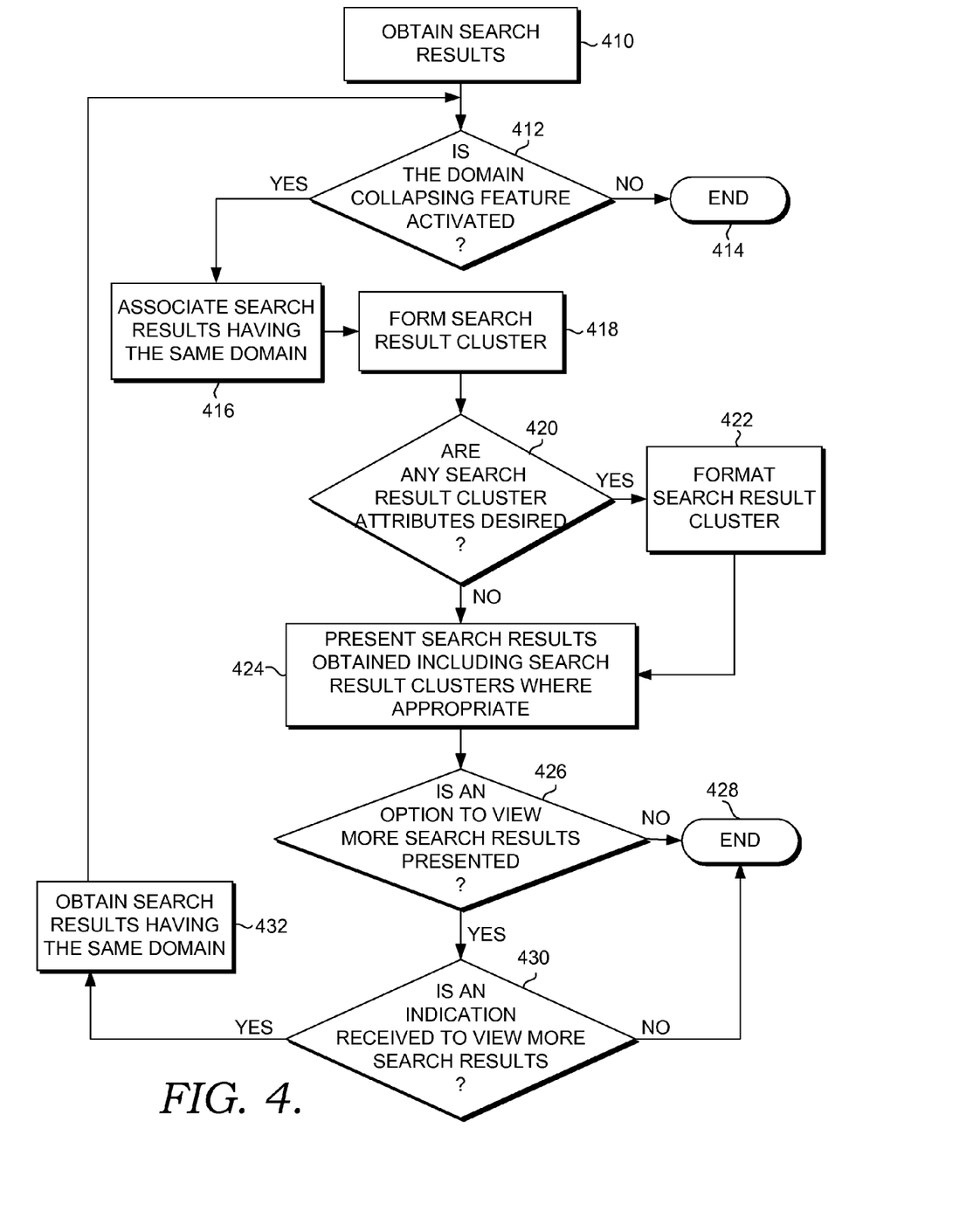
FIG. 4 is a flow diagram illustrating an exemplary method for collapsing search results, in accordance with an embodiment of the present invention.

Turning now to FIG. 4, a flow diagram is shown illustrating a method 400 for collapsing search results having the same domain, in accordance with an embodiment of the present invention. Initially, as indicated at block 410, at least a portion of search results that are relevant to a user's query are obtained. As previously mentioned, search results may be obtained by receiving the search results, retrieving the search results, or determining the search results. Subsequently, as indicated at block 412, it is determined if the domain collapsing feature is activated. If the domain collapsing feature is not activated, the process ends, as indicated at block 414. If, however, it is determined that the domain collapsing feature is activated, search results having the same domain are associated with one another, as shown at block 416. Subsequently, as indicated at block 418, search result clusters are formed where two or more search results have the same domain.

As indicated at block 420, it is next determined if any search result cluster attributes are desired. As previously mentioned, search result cluster attributes include, for example, search result rankings, relationship structures, search result limitations, structure components, title collapsing, and URL collapsing. If it is determined that one or more search result cluster attributes is desired, the search result cluster is formatted, as indicated at block 422, to include the search result cluster attribute. Thereafter, as indicated at block 424, the search results obtained, including search result clusters where appropriate, are presented. Returning to block 420, if it is determined that no search result cluster attributes are desired, the search results obtained, including search result clusters where appropriate, are presented, as indicated at block 424.

Next, as indicated at block 426, it is determined if an option to view more search results having the same domain as the search result cluster is presented. If no such option is presented, the process is ended, as indicated at block 428. On the other hand, if such an option is presented, it is next determined if an indication to view more search results having the same domain as the search result cluster is received, as indicated at block 430. If an indication to view more search results is not received, the process ends, as indicated at block 428. If, however, an indication to view more search results is received, search results having the same domain as the search results presented in the search result cluster are obtained, as indicated at block 432. In one embodiment, to obtain search results having the same domain, receiving an indication to view more search results may result in a new user query utilizing an index file manager, a middle level aggregator, and a top level aggregator to get results from the same domain. Subsequently, the process returns to block 412 where it is determined if the domain collapsing feature is activated. If it is determined that the domain collapsing feature is not activated, the method ends at block 414 and, as such, the search results having the same domain obtained at block 432 may be presented.

Figure 5:
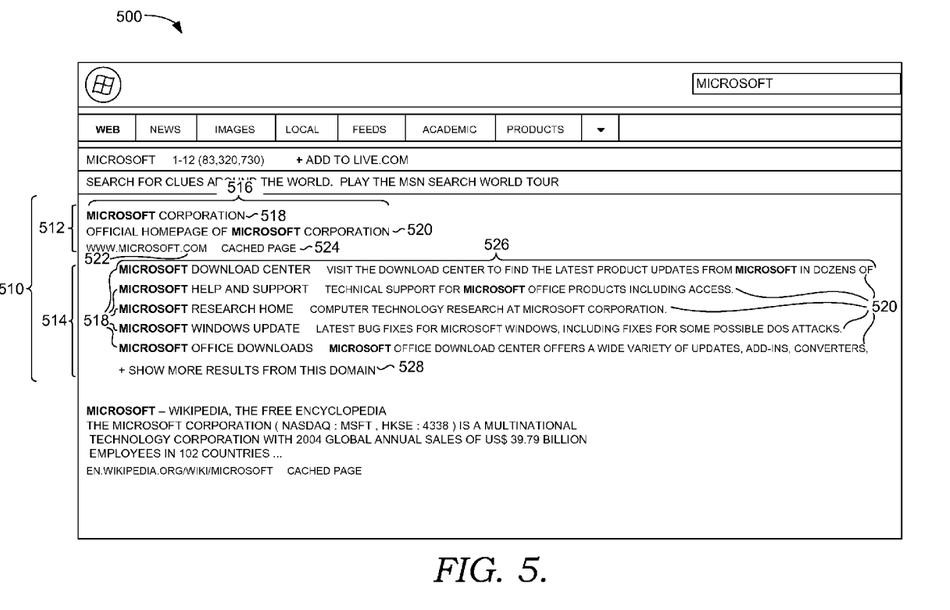
FIG. 5 is an exemplary screen display showing a first version of a search result cluster, in accordance with one embodiment of the present invention.
Figure 6:
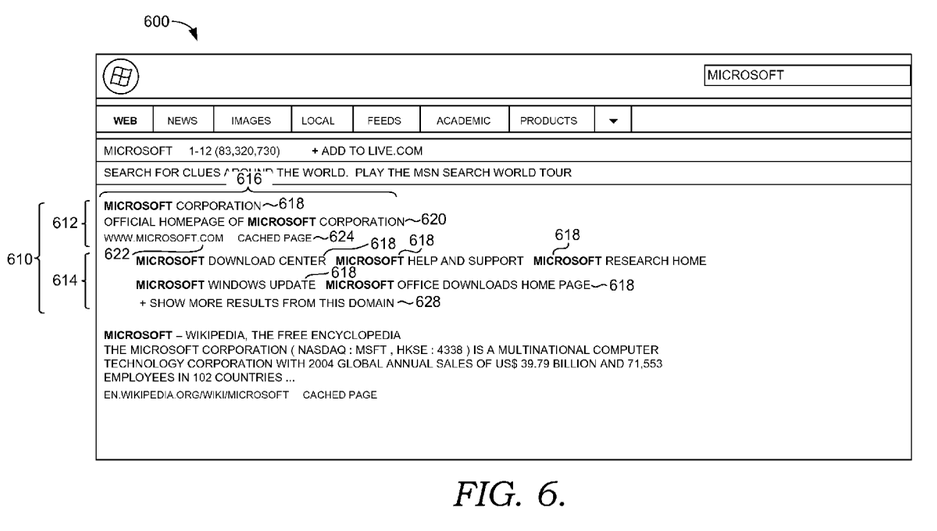
FIG. 6 is an exemplary screen display showing a second version of a search result cluster, in accordance with one embodiment of the present invention.
Figure 7:
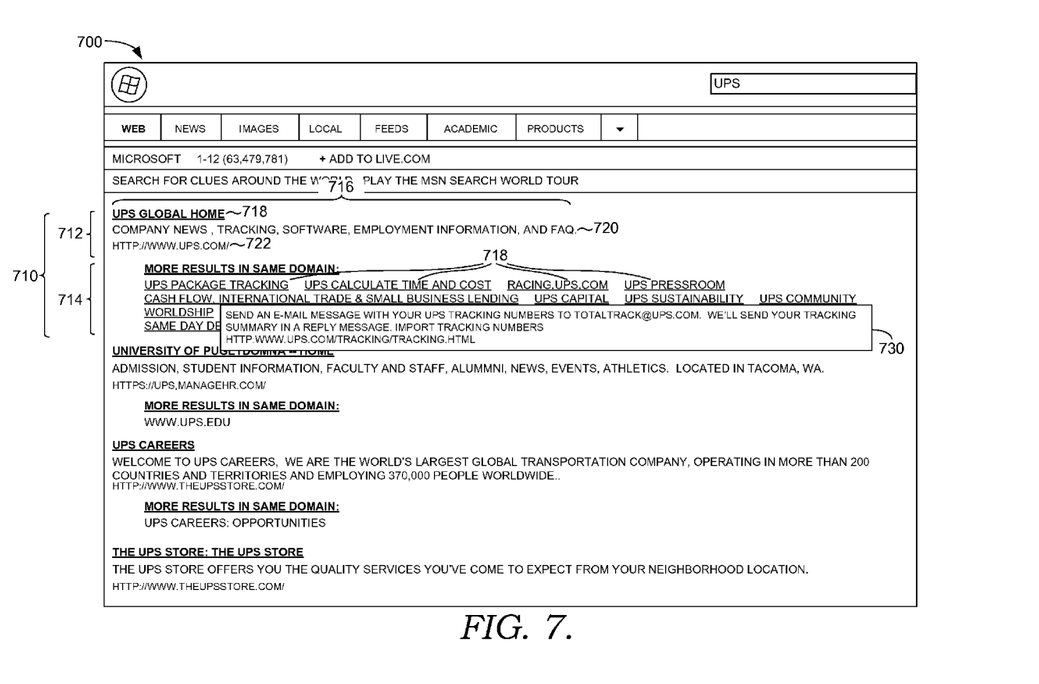
FIG. 7 is an exemplary screen display showing a third version of a search result cluster, in accordance with one embodiment of the present invention.

FIGS. 5-7 illustrate exemplary displays of a graphical user interface for a domain collapsing feature, according to embodiments of the present invention. The domain collapsing feature may include a presentation module that electronically displays one or more search results, including search result clusters where appropriate. A user can interact with the electronic display using well known input components, for example, a mouse, joystick, stylus, touch screen, keyboard, or the like.

With reference to FIG. 5, a search result page 500 displays a search result cluster 510 among search results displayed on the search result page 500. The search result cluster 510 includes a parent search result 512 and children search results 514. As shown in FIG. 5, the parent search result 512 includes a structure component set 516 comprising the document title 518, the document snippet 520, the document URL 522, and the cached page feature 524. Each child search result 514 includes a structure component set 526 comprising the document titles 518 and the document snippets 520. As illustrated in FIG. 5, the child search results 514 within the search result cluster 510 may be listed in a vertical arrangement. In such an embodiment, the document with the highest ranking may be positioned in the top position. Search result cluster 510 may further include a selectable option 528 that allows a user to select the text, "Show More Results From This Domain," to view more results having the same domain. In some embodiments, the actual domain name will replace the terms "This Domain" of the selectable text. For example, the selectable option 528 may include selectable text such as "Show More Results From Microsoft.com."

Referring to FIG. 6, a search result page 600 is illustrated showing an alternative presentation of a search result cluster 610. Like the search result cluster 510 of FIG. 5, search result cluster 610 includes a parent search result 612 and children search results 614. As shown in FIG. 6, the parent search result 612 includes a structure component set 616 comprising the document title 618, the document snippet 620, the document URL 622, and the cached page feature 624. The children search results 614 includes only the document titles 618. In such an embodiment, the number of child search results 614 presented may be limited, e.g., five child search results. As illustrated in FIG. 6, the search results within the child search results 614 may be listed in a horizontal arrangement. Search result cluster 610 may also include a selectable option 628 that allows a user to select the text, "Show More Results From This Domain," to view more results having the same domain.

With reference to FIG. 7, a search result page 700 is illustrated showing an alternative presentation of a search result cluster 710. Like the search result clusters 510 of FIG. 5 and 610 of FIG. 6, search result cluster 710 includes a parent search result 712 and children search results 714. As shown in FIG. 7, the parent search result 712 includes a structure component set 716 comprising the document title 718, the document snippet 720, and the document URL 722. The child search results 714 initially include only the document titles 718. A document snippet 730, however, is presented upon a user hovering a mouse over the corresponding document title 718. As illustrated in FIG. 7, the children search results 714 may include all of the search results having the same domain that are relevant to the user query.

One skilled in the art will appreciate that search result clusters may be presented in a multitude of arrangements. The displays set forth in FIGS. 5-7 are merely exemplary and do not limit the scope of embodiments in any form.

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. A computerized system for collapsing search results having the same domain, the system comprising:
 a search result obtaining module configured to obtain one or more search results relevant to a user query;
 a collapsing module configured to form a plurality of search result clusters to display, wherein each of the plurality of search result clusters comprise two or more search results having the same domain, wherein a document ranking associated with each search result is used to determine the two or more search results to include in each search result cluster and the order in which the two or more search results are displayed within each search result cluster; and
 a presenting module configured to display within a search results page, via a graphical user interface, at least one of the one or more obtained search results and at least one of the one or more search result clusters formed by the collapsing module having a parent search result and one or more child search results each with the same domain as the parent search result.

2. The computerized system of claim 1, further comprising a feature determining component configured to determine whether a domain collapsing feature is activated.

3. The computerized system of claim 1, further comprising a request receiving component configured to receive a request to view one or more desired search results pertaining to one of the one or more search result clusters, wherein the one or more desired search results have the same domain as the two or more search results presented in the one of the one or more search result clusters.

4. The computerized system of claim 1, wherein the search result obtaining module comprises a receiving component configured to obtain the one or more search results by receiving the one or more search results from one or more computing devices.

5. The computerized system of claim 1, wherein the search result obtaining module comprises a retrieving component configured to obtain the one or more search results by retrieving the one or more search results from one or more computing devices.

6. The computerized system of claim 1, wherein the search result obtaining module comprises:
 a query receiving component configured to receive a one or more query terms; and
 a searching component configured to search for and obtain the one or more search results.

7. The computerized system of claim 6, wherein the search result obtaining module further comprises a feature determining component configured to determine whether a domain collapsing feature is activated.

8. The computerized system of claim 6, wherein the searching component comprises one or more aggregators.

9. The computerized system of claim 8, wherein the one or more aggregators comprise one or more bottom level aggregators, one or more middle level aggregators, one or more top level aggregators, or a combination thereof.

10. One or more computer-storage media having computer-executable instructions embodied thereon that, when executed, perform a method for collapsing search results having the same domain, the method comprising:
 obtaining a plurality of search results relevant to one or more query terms;
 associating at least two of the plurality of search results having a same first domain and associating at least two of the plurality of search results having a same second domain;
 forming at least two search result clusters, wherein a first search result cluster comprises the at least two of the plurality of search results having the same first domain and a second search result cluster comprises the at least two of the plurality of search results having the same second domain;
 modifying at least the first search result cluster to limit the at least two of the plurality of search results to a particular number of search results to present, wherein a document ranking in association with each of the at least two of the plurality of search results is utilized to identify the particular search results to include in the modified first search result cluster, the document ranking indicating relevance of the corresponding search result to one or more query terms; and
 displaying, via a graphical user interface, the second search result cluster and the modified first search result cluster comprising the particular number of search results having the same first domain grouped together, wherein the order in which the particular number of search results are displayed within the first search result cluster is based on the document ranking.

11. The method of claim 10, further comprising formatting the second search result cluster to include one or more search result cluster attributes.

12. The method of claim 11, wherein the one or more search result cluster attributes comprises one or more of search result rankings, relationship structures, search result limitations, structure components, title collapsing, URL collapsing, or a combination thereof.

13. The method of claim 10, further comprising presenting an option to view one or more desired search results pertaining to the second search result cluster, wherein the one or more desired search results have the same second domain.

14. The method of claim 13, further comprising:
receiving a request to view the one or more desired search results;
obtaining the one or more desired search results; and
presenting the obtained one or more desired search results.

15. The method of claim 10, wherein obtaining the plurality of search results comprises receiving search results provided by one or more computing devices.

16. The method of claim 10, wherein obtaining the plurality of search results comprises determining search results with one or more aggregators, wherein the one or more aggregators comprises one or more bottom level aggregators, one or more middle level aggregators, one or more top level aggregators, or a combination thereof.

17. A graphical user interface embodied on one or more computer-storage media and executable on a computing device, the graphical user interface comprising a first display area on a user's computer configured for displaying a plurality of search result clusters within a search results page, each of the plurality of search result clusters comprises two or more search results having the same domain, wherein a document ranking associated with each search result is used to determine the two or more search results to include in each of the plurality of search result clusters and the order in which the two or more search results are displayed within each of the plurality of the search result clusters.

18. The graphical user interface of claim 17, wherein the two or more search results having the same domain comprise a parent search result having a parent document title, a parent document snippet, and a parent document caption URL, and at least one child search result having a child document title and a child document snippet.

19. The graphical user interface of claim 17, wherein each of the two or more search results having the same domain comprise one or more structure components where one of the one or more structure components comprises a document URL, a document caption URL, a document title, a document snippet, a document domain, a cached page feature, or a combination thereof.

20. The graphical user interface of claim 17, wherein the first display area is further configured for displaying an option to view one or more desired search results pertaining to one of the one or more search result clusters, wherein the one or more desired search results have the same domain as the two or more search results presented in the one of the one or more search result clusters.

* * * * *